United States Patent
Sugai et al.

(10) Patent No.: US 9,757,791 B2
(45) Date of Patent: Sep. 12, 2017

(54) PLATE-SHAPED WORKPIECE FORMING METHOD

(75) Inventors: Atsushi Sugai, Tokyo (JP); Yu Matsunaga, Tokyo (JP); Daisuke Ogura, Tokyo (JP); Shoichi Morimoto, Tokyo (JP); Minoru Arima, Tokyo (JP); Yuichi Kaneda, Tokyo (JP); Akihiko Egami, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 580 days.

(21) Appl. No.: 13/981,794

(22) PCT Filed: Mar. 6, 2012

(86) PCT No.: PCT/JP2012/055725
§ 371 (c)(1),
(2), (4) Date: Jul. 25, 2013

(87) PCT Pub. No.: WO2012/132791
PCT Pub. Date: Oct. 4, 2012

(65) Prior Publication Data
US 2013/0309523 A1 Nov. 21, 2013

(30) Foreign Application Priority Data
Mar. 31, 2011 (JP) .................... 2011-081189

(51) Int. Cl.
*B21D 53/92* (2006.01)
*B23P 15/00* (2006.01)
(Continued)

(52) U.S. Cl.
CPC .............. *B21D 53/92* (2013.01); *B21D 5/06* (2013.01); *B21D 5/08* (2013.01); *B21D 5/083* (2013.01);
(Continued)

(58) Field of Classification Search
CPC .... B32B 1/00; B32B 1/02; B32B 3/00; B32B 3/10; B32B 15/00; B32B 15/01;
(Continued)

(56) References Cited

U.S. PATENT DOCUMENTS 4,858,853 A * 8/1989 Westerman ........... B64F 5/0081
244/119
2007/0274797 A1 11/2007 Panczuk et al.
(Continued)

FOREIGN PATENT DOCUMENTS

| CN | 1689723 | 11/2005 |
| CN | 1704262 | 12/2005 |

(Continued)

OTHER PUBLICATIONS

Decision to Grant a Patent issued Sep. 8, 2015 in corresponding Chinese patent application No. 201280007169.9 (with English translation).

(Continued)

*Primary Examiner* — Michael E La Villa
(74) *Attorney, Agent, or Firm* — Wenderoth, Lind & Ponack, L.L.P.

(57) ABSTRACT

A plate-shaped workpiece forming method of post-machining a pocket (3) on a curved inner surface of a plate-shaped workpiece (2) in a state where the plate-shaped workpiece (2) curved by a curving machine (10) is spread flat. The method includes a curving step (A) of setting a net curve radius ($R_0$) obtained by adding a curve radius contraction amount ($R_1$) due to spring-in to a finished curve radius (R) of a plate-shaped workpiece (2), taking into account an amount of contraction of the curve radius of the plate-shaped workpiece (2) between before and after machining of a pocket (3) due to spring-in, and curving the plate-shaped workpiece (2) so as to achieve the net curve radius ($R_0$); and (Continued)

a pocket machining step of post-machining the pocket (3) by flatly spreading the curved plate-shaped workpiece (2).

4 Claims, 7 Drawing Sheets

(51) Int. Cl.
| | |
|---|---|
| *B21D 17/04* | (2006.01) |
| *B21D 17/02* | (2006.01) |
| *B21D 11/00* | (2006.01) |
| *B21D 11/20* | (2006.01) |
| *B21D 5/14* | (2006.01) |
| *B21D 5/06* | (2006.01) |
| *B21D 21/00* | (2006.01) |
| *B21D 5/08* | (2006.01) |
| *B23P 13/00* | (2006.01) |
| *B23P 25/00* | (2006.01) |
| *B21D 11/08* | (2006.01) |

(52) U.S. Cl.
CPC .............. *B21D 5/14* (2013.01); *B21D 11/00* (2013.01); *B21D 11/08* (2013.01); *B21D 11/20* (2013.01); *B21D 11/203* (2013.01); *B21D 17/02* (2013.01); *B21D 17/04* (2013.01); *B21D 21/00* (2013.01); *B23P 13/00* (2013.01); *B23P 25/00* (2013.01); *B23P 15/00* (2013.01); *B23P 2700/01* (2013.01); *Y10T 428/12389* (2015.01)

(58) Field of Classification Search
CPC ..... Y10T 428/12389; Y10T 428/12396; Y10T 428/12382; Y10T 428/12361; Y10T 428/1241
See application file for complete search history.

(56) References Cited

U.S. PATENT DOCUMENTS

| | | | |
|---|---|---|---|
| 2009/0205395 A1* | 8/2009 | Gilbert .................. | B21D 13/04 72/379.6 |
| 2013/0008222 A1* | 1/2013 | Ota ....................... | B21D 11/08 72/379.2 |

FOREIGN PATENT DOCUMENTS

| | | |
|---|---|---|
| FR | 2 594 360 | 8/1987 |
| JP | 61-242723 | 10/1986 |
| JP | 4-158929 | 6/1992 |
| JP | 7-80555 | 3/1995 |
| JP | 10-166059 | 6/1998 |
| JP | 11-197748 | 7/1999 |
| JP | 2000-140943 | 5/2000 |
| JP | 2003-25021 | 1/2003 |
| JP | 2006-35245 | 2/2006 |
| JP | 2007-508952 | 4/2007 |
| JP | 2009-736 | 1/2009 |
| JP | 2010-240712 | 10/2010 |
| JP | 2011-194425 | 10/2011 |
| SU | 1616746 | 12/1990 |
| WO | WO 2011/115244 | * 9/2011 |

OTHER PUBLICATIONS

Decision to Grant a Patent issued Oct. 29, 2015 in corresponding European patent application No. 12764717.0.
International Search Report issued Jun. 5, 2012 in International Application No. PCT/JP2012/055725.
Written Opinion of the International Searching Authority issued Jun. 5, 2012 in International Application No. PCT/JP2012/055725.
Office Action issued Jul. 31, 2014 in corresponding Chinese patent application No. 201280007169.9 (with English translation).
Extended European Search Report issued Aug. 12, 2014 in corresponding European patent application No. 12764717.
Zhang Lei et al., Wing-skin Panel Shape Surface Flattening and the Application on Unwrapping and Modeling, Aircraft Design, vol. 30, No. 3, pp. 35-38 and 71, Jun. 2010.
Gan Zhong et al., Research on springback compensation of mold surface for age forming of integral panel, Journal of Plasticity Engineering, vol. 17, No. 5, Oct. 2010.
Xiao Han et al., Experimental research on the plastics filling roll bending process of integral panel skins with grid-type ribs, Journal of Plasticity Engineering, vol. 16, No. 4, pp. 17-20, Aug. 2009.
Huang Lin et al., Springback compensation algorithm for age forming of thick aluminum alloy sheets, Journal of Aviation, vol. 29, No. 5, pp. 1406-1410, Sep. 2008.
Shi Xaohui et al., Research on the structural feature mapping method in unwrapping an integral panel blank with grid-type ribs and its application, Journal of Plasticity Engineering, vol. 16, No. 2, pp. 76-79, Apr. 2009.
Notification issued Nov. 4, 2014 in corresponding Japanese patent application No. 2011-081189.
New Energy and Industrial Technology Development Organization (NEDO), First "Research and Development of Environmentally Compatible High-Performance Small Aircraft" (intermediate evaluation), Subcommittee, (held on Jun. 26, 2006), Material 5-1, Original Record (Published version) No. 5.
Vacuum, mechanical clamps team to mill Airbus skin: to mill large but thin sheets of aluminium, without damaging the pre-formed aluminium sheets forming the fuselage, Airbus is using a combination of mechanical and vacuum clamping and work handling equipment. (copyright 2005).
Office Action issued Dec. 8, 2015 in corresponding Japanese patent application No. 2011-08189 (with English translation).
Decision to Grant a Patent issued Mar. 8, 2016 in corresponding Japanese patent application No. 2011-081189.
Notice of Allowance issued Nov. 29, 2016 in corresponding Canadian patent application No. 2825756.

* cited by examiner

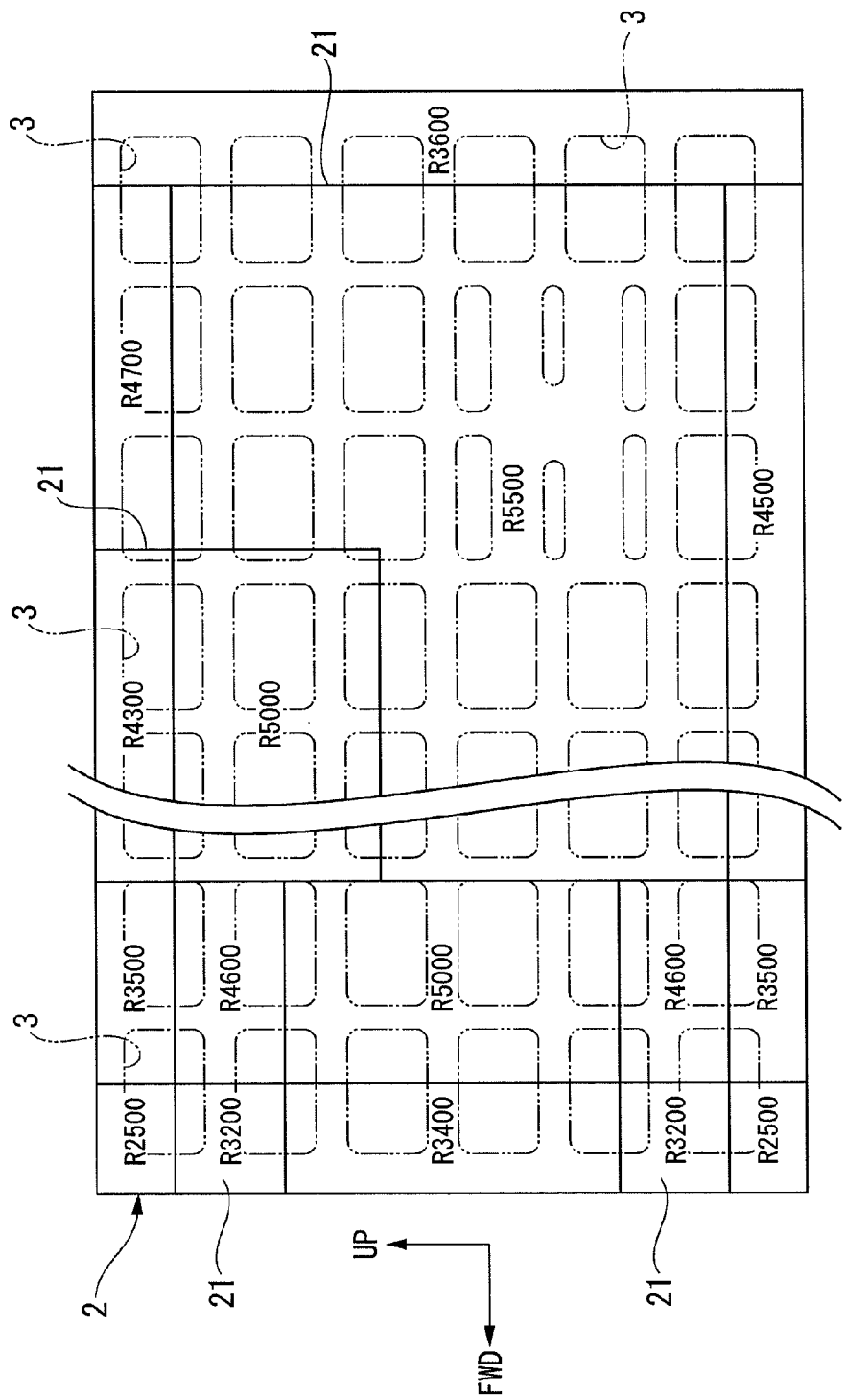

PLATE-SHAPED WORKPIECE FORMING METHOD

TECHNICAL FIELD

The present invention relates to a plate-shaped workpiece forming method and a formed article.

BACKGROUND ART

It is often the case that a lightweight aluminum alloy plate, etc. are used for an outer plate and the like applied to a fuselage of a commercial aircraft, and pocket machining (thin-wall machining) is performed thereon to further reduce the weight. Pocket machining refers to formation of multiple pockets (recesses) on the inner surface of the outer plate by machine cutting or chemical milling (etching). However, besides being costly and taking a long machining time, chemical milling is becoming difficult to apply due to recent environmental regulations, since the aluminum alloy removed from the pocket is dissolved in a chemical solution and becomes a large amount of waste liquid, which cannot be recycled. Therefore, a plate-shaped workpiece forming method which can efficiently machine the pocket by machine cutting has been explored.

Since the outer plate constituting the fuselage of the aircraft has a curved shape with a predetermined curve radius, the outer plate is curved before or after the aforementioned pocket machining. Conventionally, there have been a method called bending-first forming method of performing pocket machining as post-machining after curving the plate-shaped workpiece intended for the outer plate, and a reverse method called bending-later forming method of curving the plate-shaped workpiece after performing pocket machining thereon.

An advantage of the bending-later forming method is that, since pocket machining is performed on the plate-shaped workpiece in a flat state, the pocket can be machined efficiently by machine cutting. On the other hand, as the plate-shaped workpiece is curved after the pocket has been machined and the plate thickness has become uneven, it tends to be curved into a polygonal shape. To prevent this, it is necessary to stuff a shim material into the multiple recesses made by pocket machining to achieve an apparently even plate thickness before curving, and significant cost and labor have been expended on the manufacturing and fitting of such a shim material.

Further, the bending-first forming method includes a method, as disclosed in Patent Literature 1, of machining the pocket by machine cutting the curved plate-shaped workpiece in a curved state as it is, and a method of machining the pocket by machine cutting the curved plate-shaped workpiece in a state where the curved plate-shaped workpiece is temporarily spread flat and pressed down.

CITATION LIST

Patent Literature

{PTL 1}
Japanese Translation of PCT International Application, Publication No. 2007-508952

SUMMARY OF INVENTION

Technical Problem

In the pocket machining method disclosed in Patent Literature 1, in order to perform pocket machining on the curved plate-shaped workpiece, it is necessary to place a machine cutting part against a surface to be machined of the plate-shaped workpiece and to place a holding member against the accurately corresponding portion on the backside of the surface, and these machine cutting part and holding member have to be three-dimensionally moved along a shape of the huge plate-shaped workpiece. This makes the pocket machining device very large and complicate, as well as expensive, and since a ball end mill has to be used as the machine cutting part, the machining efficiency is low (machining time is long).

On the one hand, an advantage of the bending-first forming method of performing pocket machining in a state where the curved plate-shaped workpiece is spread flat is that, similar to the bending-later forming method, the shape of the plate-shaped workpiece at the time of pocket machining is flat, which allows the pocket to be machined efficiently by machine cutting. On the other hand, the bending-first forming method has a drawback that it causes a phenomenon so-called spring-in (or spring-go) that a curve radius (curvature) of the plate-shaped workpiece after completion of pocket machining becomes smaller than an originally targeted finished curve radius.

More specifically, since in the curved plate-shaped workpiece, a compression reaction force (a force which tries to stretch the plate-shaped workpiece) accumulated on the inner surface side and a tensile reaction force (a force which tries to roll the plate-shaped workpiece) accumulated on the outer surface side are opposite to each other and balanced, machining the pocket by machine cutting the inner surface side results in a decrease in the compression reaction force on the inner surface side and an inevitable increase in the proportion of the tensile reaction force on the outer surface side. For this reason, although the bending-first forming method can efficiently machine the pocket, it has not been used very often due to the necessity of a correction step of correcting the curve radius after machining the pocket.

The present invention has been made in order to solve the above problems, and an object thereof is to provide a plate-shaped workpiece forming method which can prevent, without resorting to any novel machining equipment, the curve radius of the plate-shaped workpiece after pocket machining from becoming smaller than the finished curve radius due to spring-in in the bending-first forming method of machining the pocket in a state where the curved plate-shaped workpiece is spread flat, and a formed article.

Solution to Problem

In order to achieve the above object, the present invention provides the following solutions.

According to a first aspect of the present invention, there is provided a plate-shaped workpiece forming method of post-machining a pocket on a curved inner surface of a plate-shaped workpiece in a state where the plate-shaped workpiece curved by a curving machine is spread flat, including: a curving step of setting a net curve radius $R_0$ obtained by adding a curve radius contraction amount $R_1$ to a finished curve radius R of the plate-shaped workpiece, taking into account an amount of contraction of a curve radius of the plate-shaped workpiece between before and after machining of the pocket due to spring-in, and curving the plate-shaped workpiece so as to have the net curve radius $R_0$; and a pocket machining step of post-machining the pocket by flatly spreading the curved plate-shaped workpiece.

According to the above forming method, first in the curving step, the curve radius obtained by adding the curve radius contraction amount $R_1$, which is caused by post-machining the pocket on the inner circumferential surface of the plate-shaped workpiece, to the finished curve radius R, namely, a larger curve radius than the finished curve radius R, is set as the net curve radius $R_0$, and the plate-shaped workpiece is curved so as to have this net curve radius $R_0$. Next, in the pocket machining step, the plate-shaped workpiece is held in a flatly spread state and the pocket is machined. When holding of the plate-shaped workpiece in the spread state is released, due to spring-in caused by pocket machining, the curve radius of the plate-shaped workpiece becomes a curve radius of the originally set net curve radius $R_0$ with the curve radius contraction amount $R_1$ cancelled, namely, the finished curve radius R.

Thus, since the curve radius of the plate-shaped workpiece changes from the net curve radius $R_0$ to the finished curve radius R due to spring-in occurring after machining of the pocket, the curve radius of the plate-shaped workpiece is prevented from becoming smaller than the finished curve radius R after pocket machining, and the correction step of correcting the curve radius after pocket machining is not required. Since the plate-shaped workpiece is in a flat-plate state with no pocket is machined yet at the time of curving the plate-shaped workpiece, it can be curved quickly using a roll-forming machine having high machining speed. In addition, since pocket machining is performed in a state where the plate-shaped workpiece is spread flat, it can be performed efficiently by machine cutting.

According to a second aspect of the present invention, in the plate-shaped workpiece forming method of the first aspect, when an interval between machining parts of the curving machine for forming the finished curve radius R is denoted by H, and an interval between the same machining parts for forming the net curve radius $R_0$ is denoted by $H_0$, the net curve radius $R_0$ is formed under a condition of $H<H_0$.

According to the above method, it is possible, without resorting to any novel machining equipment but by using the existing curving machine as it is, to prevent the curve radius of the plate-shaped workpiece after pocket machining from becoming smaller than the finished curve radius R due to spring-in by changing only the interval between the machining parts of the curving machine.

According to a third aspect of the present invention, in the plate-shaped workpiece forming method of the second aspect, the interval between the machining parts is changed during curving.

According to the above method, for example, in a case where the curving machine is a roll-forming machine, the net curve radius $R_0$ can be changed by changing an interval between upper and lower rollers (machining parts) during curving of the plate-shaped workpiece. Therefore, it is possible to machine the plate-shaped workpiece to a compound curve radius in which the net curve radius $R_0$ (finished curve radius R) changes in a feed direction of the plate-shaped workpiece.

According to a fourth aspect of the present invention, in the plate-shaped workpiece forming method of the first aspect, setting of the net curve radius $R_0$ is performed by attaching in advance a shim material having a predetermined thickness to a surface of the plate-shaped workpiece where pocket machining is performed, and the plate-shaped workpiece in this state is curved with a constant interval between the machining parts of the curving machine.

According to the above configuration, for example, when the shim material is attached to the surface to be on the inside of the curve of the plate-shaped workpiece and the plate-shaped workpiece is curved by the curving machine with a constant machining parts interval, an amount of inward bending becomes larger compared to a case where the shim material is not attached, which causes the curve radius of the plate-shaped workpiece to become smaller. Therefore, when a machining amount (depth, area, etc.) of the pocket is large, the shim material is made thinner so as to set the net curve radius $R_0$ to be larger, taking into account a larger curve radius contraction amount $R_1$ to be caused by spring-in, and conversely, when the machining amount of the pocket is small, the shim material is made thicker so as to set the net curve radius $R_0$ to be smaller, and thereby the finished curve radius R after pocket machining can be made uniform.

According to a fifth aspect of the present invention, in the plate-shaped workpiece forming method of the fourth aspect, an area to which the shim material is attached is divided into a plurality of regions, and a thickness of the shim material is varied among these regions.

According to the above method, even if the dimensions and shapes of the pockets (shape, depth, area, interval, etc.) vary among the regions of the plate-shaped workpiece, by correspondingly varying the thickness of the shim material among the regions, the net curve radius $R_0$ can be set separately for each region and the finished curve radius R after pocket machining can be made uniform.

A formed article according to a sixth aspect of the present invention is formed by the plate-shaped workpiece forming method according to any one of the first to fifth aspects.

According to the above formed article, in the formed article in which the pocket is machined on the curved inner surface side of the curved plate-shaped workpiece, the curve radius can be prevented from becoming smaller than the target finished curve radius R.

Advantageous Effects of Invention

Thus, according to the plate-shaped workpiece forming method and the formed article of the present invention, it is possible, without resorting to any novel machining equipment, to prevent the curve radius of the plate-shaped workpiece after pocket machining from becoming smaller than the finished curve radius due to spring-in, and to improve the productivity of the formed article by omitting a step of correcting the curve radius in the bending-first forming method of machining the pocket in a state where the plate-shaped workpiece after curving is spread flat.

BRIEF DESCRIPTION OF DRAWINGS

FIG. 10 is a plan view showing an example in which the plate-shaped workpiece is divided into a plurality of regions and the shim having a different thickness is attached to each region.

DESCRIPTION OF EMBODIMENTS

Hereinbelow, embodiments of the present invention will be described with reference to FIGS. 1 to 10.

Figure 1:
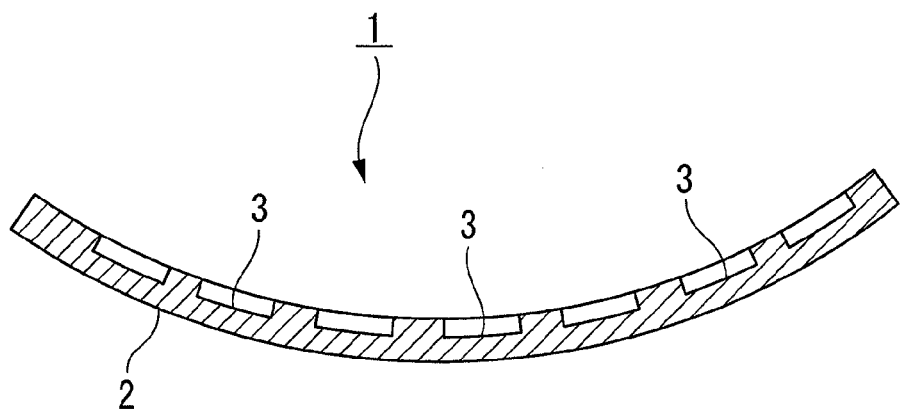
FIG. 1 is a longitudinal cross-sectional view showing one example of an aircraft outer plate formed by a forming method according to the present invention.

FIG. 1 is a longitudinal cross-sectional view showing one example of an aircraft outer plate formed by a forming method according to the present invention. This aircraft outer plate 1 (formed article) is formed with a plate-shaped workpiece 2, which is a lightweight aluminum alloy plate, curved with a predetermined curve radius (e.g., finished curve radius R=3000 mm), and multiple pockets 3 are formed on the curved inner surface in order to further reduce the weight. The forming method according to the present invention is a bending-first forming method of post-machining the pocket 3 by machine cutting after curving the plate-shaped workpiece 2 and temporarily spreading the plate-shaped workpiece 2 flat, and includes curving step A, pocket machining step B, and inspection and trimming step C to be described below.

Figure 2:
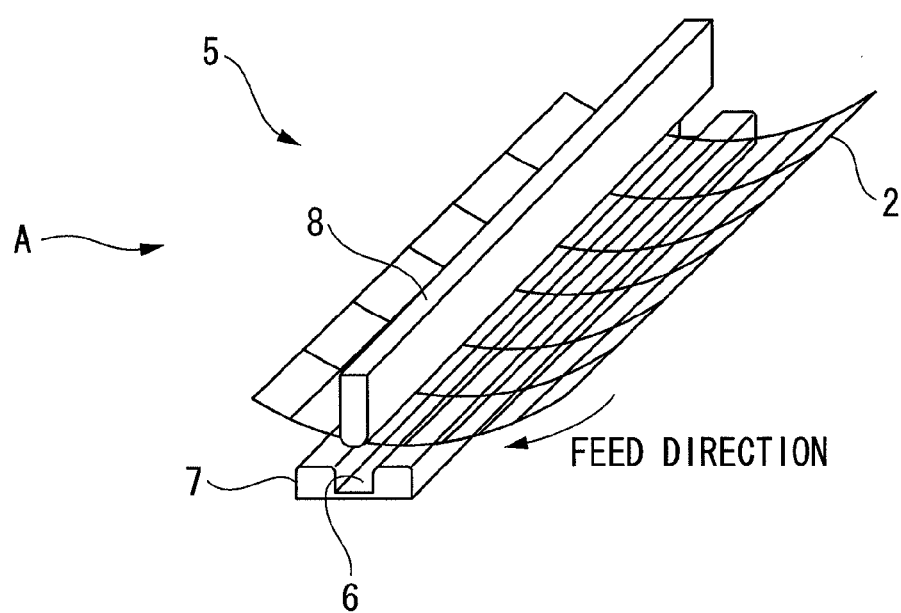
FIG. 2 is a perspective view showing a state where a plate-shaped workpiece is curved by a press brake forming machine in curving step.
Figure 3:
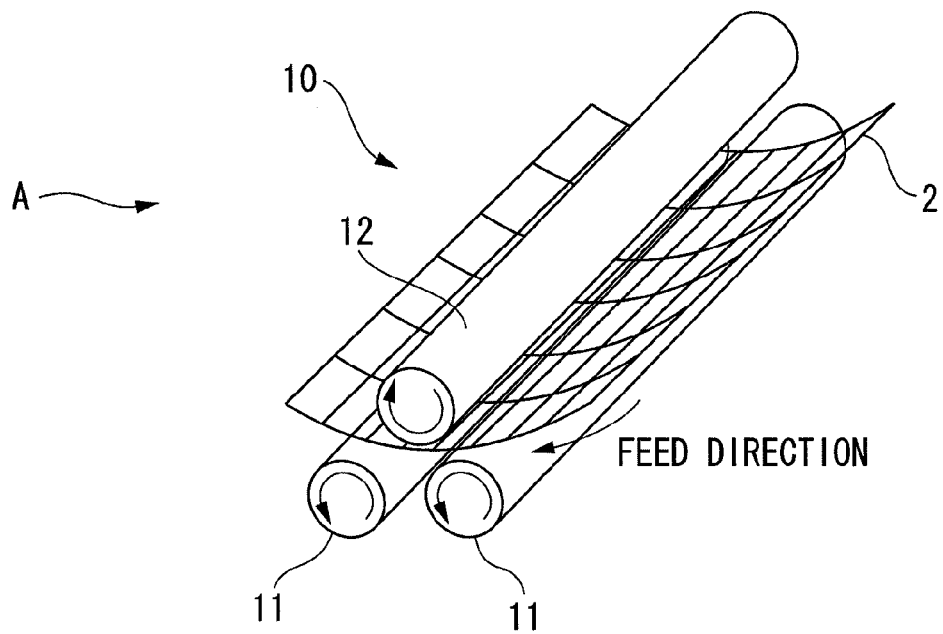
FIG. 3 is a perspective view showing a state where the plate-shaped workpiece is curved by a roll-forming machine in curving step.

{Curving Step A} (See FIGS. 2 and 3)

Representative methods of curving the plate-shaped workpiece 2 in curving step A includes a press-forming method by a press brake forming machine 5 shown in FIG. 2, and a roll-forming method by a roll-forming machine 10 shown in FIG. 3. The press-forming method is a method of gradually curving the plate-shaped workpiece 2, in which the plate-shaped workpiece 2 is sandwiched between a lower die 7, which has a substantially recessed shape in a longitudinal cross-section and includes a recessed groove 6, and an upper die 8, which has a rail shape and is disposed just above and along the recessed groove 6 of the lower die 7, of the press brake forming machine 5, and while the plate-shaped workpiece 2 is being intermittently fed in a feed direction indicated by an arrow, the upper die 8 is lowered after each feed so as to be pressed into the recessed groove 6 of the lower die 7, thereby applying a shearing load to the plate-shaped workpiece 2 by the lower die 7 and the upper die 8.

The roll-forming method is a method of curving the plate-shaped workpiece 2, in which the plate-shaped workpiece 2 is sandwiched between two lower rollers 11 disposed parallel to each other and one upper roller 12 disposed just above and between these lower rollers 11, of the roll-forming machine 10, and while the plate-shaped workpiece 2 is being fed at a constant rate in a feed direction indicated by an arrow, the upper roller 12 is pressed toward the side of the lower rollers 11 so as to apply a bending load to the plate-shaped workpiece 2. Due to the faster feed rate of the plate-shaped workpiece 2 than in the press-forming method, the roll-forming method can quickly curve the plate-shaped workpiece 2.

Figure 4:
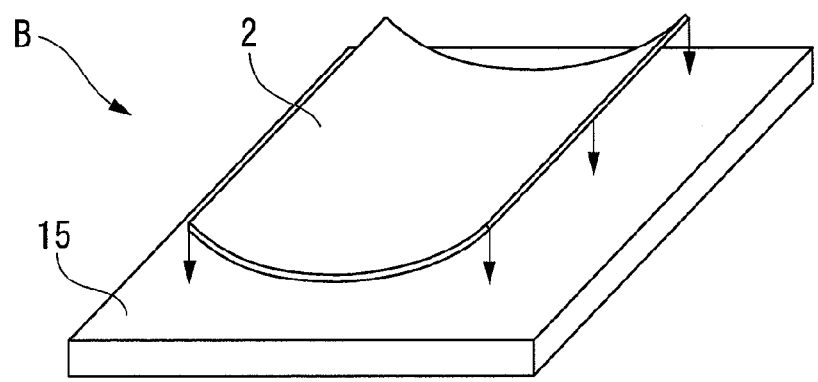
FIG. 4 is a perspective view showing a state where the plate-shaped workpiece is placed on a flat surface plate in pocket machining step.
Figure 5:
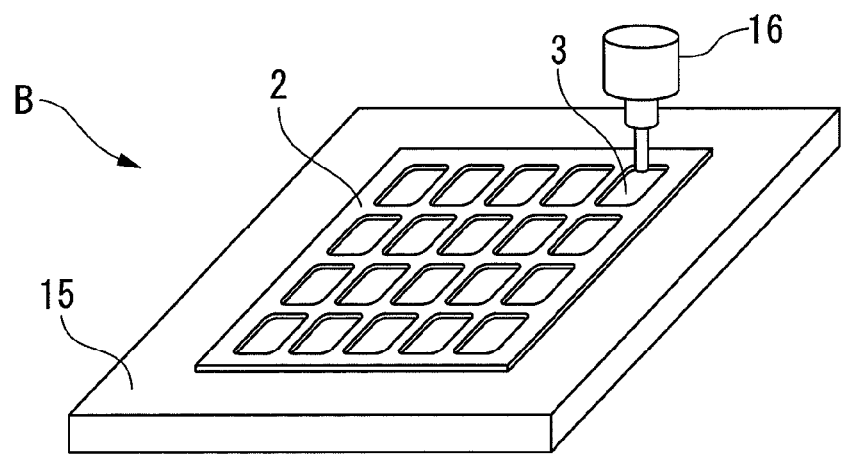
FIG. 5 is a perspective view showing a state where a pocket is machined in a state where the plate-shaped workpiece is spread flat on the surface plate in pocket machining step.

{Pocket Machining Step B} (See FIGS. 4 and 5)

The curved plate-shaped workpiece 2 undergoes machining of the pocket 3 in the next pocket machining step B. As shown in FIG. 4, the plate-shaped workpiece 2 is placed on a flat surface plate 15, and held to be flat by a holding part or a suction device (not shown) in a spread state. Then, as shown in FIG. 5, the pocket 3 is machined by cutting with a cutting tool such an end mill 16. Since the plate-shaped workpiece 2 is in a flat state at this time, the pocket 3 can be efficiently machined.

Figure 6:
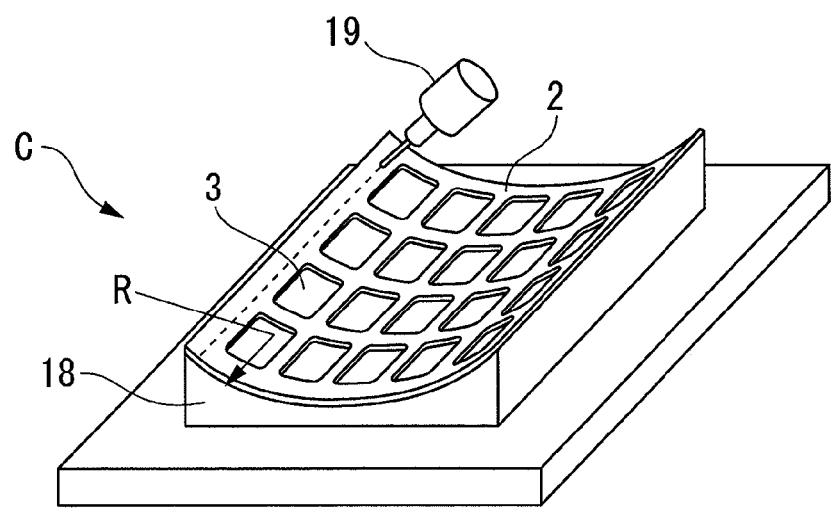
FIG. 6 is a perspective view showing a trimming step where the plate-shaped workpiece is inspected for its curve radius and trimmed in inspection and trimming step.

{Inspection and Trimming Step C} (See FIG. 6)

Next, the plate-shaped workpiece 2 is released from the holding on the surface plate 15, and as shown in FIG. 6, placed on a shape inspection die 18 having a curved upper surface in inspection and trimming step C. A curvature of the upper surface of the shape inspection die 18 is set to be equal to that of the finished curve radius R of the aircraft outer plate 1. Since the plate-shaped workpiece 2 is curved in curving step A and thereafter the pocket 3 is cut in a state where the plate-shaped workpiece 2 is temporarily spread flat in pocket machining step B, as mentioned in the section of Technical Problem, spring-in occurs due to machining of the pocket 3, which makes the curve radius of the plate-shaped workpiece 2 smaller after machining of the pocket 3 than before.

For this reason, as described later, in curving step A, a curve is formed taking into account an amount of contraction of the curve radius due to spring-in so that the curve radius becomes larger (the curve becomes shallower) than the finished curve radius R, and a calculation is made so that the curve radius becomes equal to the finished curve radius R by occurrence of spring-in along with machining of the pocket 3. Then, after pocket machining step B, it is inspected whether the curve radius has become the finished curve radius R as planned on the shape inspection die 18. If the curve radius has not become the finished curve radius R, correction work is performed. At the same time with this inspection, trimming of unnecessary portions, boring, and the like are performed using a tool such as a cutter 19, thereby finishing the aircraft outer plate 1.

{First Embodiment of Curving step A}

Figure 7:
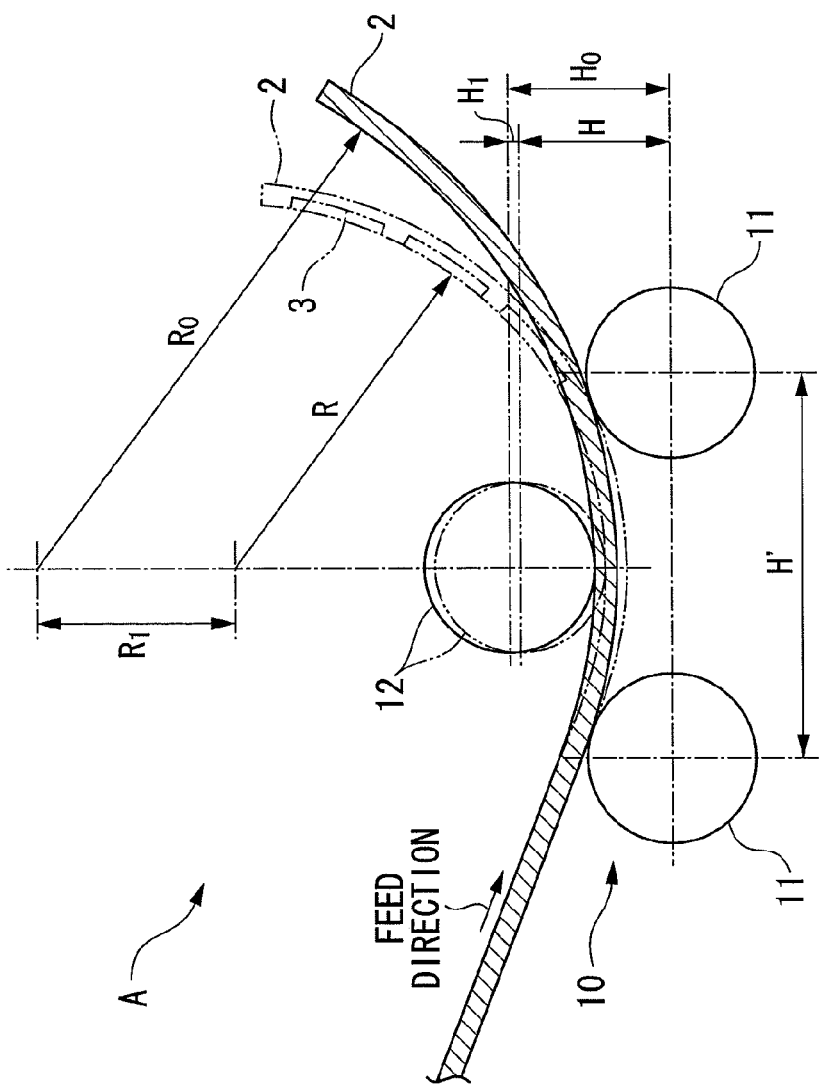
FIG. 7 is a longitudinal cross-sectional view showing a first embodiment of curving step.

FIG. 7 is a longitudinal cross-sectional view showing a first embodiment of curving step A. Here, an example where the roll-forming machine 10 shown in FIG. 3 is used as the curving machine will be described, but the press brake forming machine 5 shown in FIG. 2 may also be used.

In the first embodiment of curving step A, a net curve radius $R_0$ obtained by adding a curve radius contraction amount $R_1$ to a finished curve radius R of the plate-shaped workpiece 2 is set, taking into account an amount of contraction of the curve radius of the plate-shaped workpiece 2 due to spring-in caused by machining of the pocket 3 in the plate-shaped workpiece 2 in the next step of pocket machining step B, and the plate-shaped workpiece 2 is curved so as to achieve the net curve radius $R_0$.

Specifically, when a roller interval between the lower rollers 11 (machining parts) and the upper roller 12 (machining part) for forming the finished curve radius R is denoted by H, and similarly a roller interval for forming the above net curve radius $R_0$ is denoted by $H_0$, the interval between the lower rollers 11 and the upper roller 12 is set so as to satisfy $H<H_0$ in the roll-forming machine 10. A setting difference between H and $H_0$ is denoted by $H_1$. The numerical value of $H_0$ is determined by actually curving a mock-up test piece of the plate-shaped workpiece 2 as a trial. This test curving needs to be performed only once or twice, and after the roller interval $H_0$ at which the curve radius of the test piece becomes the net curve radius $R_0$ is successfully set, the plate-shaped workpieces 2 for mass production are sequentially curved.

Thereafter, in pocket machining step B, the plate-shaped workpiece 2 which has been curved at a curvature of the net curve radius $R_0$ is spread flat and the pocket 3 is machined. When the holding of the plate-shaped workpiece 2 in the spread state is released, the curve radius of the plate-shaped workpiece 2 becomes a curve radius of the originally set net curve radius $R_0$ with the curve radius contraction amount $R_1$ cancelled, namely, the finished curve radius R, due to spring-in caused by machining of the pocket 3.

In this way, since the curve radius of the plate-shaped workpiece 2 is caused to change from the net curve radius $R_0$ to the finished curve radius R taking advantage of spring-in occurring after machining the pocket 3, the curve radius of the plate-shaped workpiece 2 is prevented from becoming smaller than the finished curve radius R after machining of the pocket 3. Therefore, correction step of correcting the curve radius after machining of the pocket 3 is not required.

Besides that correction step of correcting the curve radius after machining of the pocket 3 is not required, the plate-shaped workpiece 2 is in a flat-plate state without the pocket 3 and easy to curve in curving step A, and the pocket 3 can be machined efficiently by machine cutting with the plate-shaped workpiece 2 held to be flat in pocket machining step B. Thus, the productivity of the aircraft outer plate 1 can be drastically improved.

Since setting of the net curve radius $R_0$ in curving step A can be performed by just changing the roller interval H between the lower rollers 11 and the upper roller 12 of the roll-forming machine 10 to $H_0$, the existing roll-forming machine 10 can be used as it is without resorting to any novel machining equipment, and there is no need for facility investment nor additional workers. For this reason, the manufacturing cost of the aircraft outer plate 1 is unlikely to increase; on the contrary, a significant cost reduction can be realized by the increased productivity.

In this embodiment, setting of the net curve radius $R_0$ by the roll-forming machine 10 is performed by changing the roller interval H between the lower rollers 11 and the upper roller 12 to $H_0$, but it may also be performed, for example, by changing an interval H' between the two lower rollers 11 as shown in FIG. 7.

Now, the pockets 3 formed in the plate-shaped workpiece 2 are not always formed under the uniform conditions over the entire surface of the plate-shaped workpiece 2. That is, the shape, area, depth, interval, and the like of the pockets 3 often vary among portions of the plate-shaped workpiece 2. Particularly, the depth often varies along a feed direction of the plate-shaped workpiece 2 at the time of curving, even if the formation intervals of the pockets 3 are constant.

In such a case, the plate-shaped workpiece 2 may be curved at once while changing the roller interval H between the lower rollers 11 and the upper roller 12 (or the interval H' between the lower rollers 11) in curving step A. More specifically, the net curve radius $R_0$ is made larger by increasing the roller interval H (H') in a region where the pocket 3 having a shape which causes larger spring-in is formed, and conversely, the net curve radius $R_0$ is made smaller by reducing the roller interval H (H') in a region where the pocket 3 having a shape which causes smaller spring-in is formed.

In this way, the plate-shaped workpiece 2 is curved into a shape having a compound curved surface after curving step A, but due to machining of the various types of pockets 3 in the respective curved regions in the next pocket machining step B, a different degree of spring-in occurs in each curved region, and as a result, the curvature of the plate-shaped workpiece 2 is uniformized to be the finished curve radius R. Thus, the plate-shaped workpiece 2 can be easily machined to a compound curve radius in which the net curve radius $R_0$ (finished curve radius R) varies in the feed direction of the plate-shaped workpiece 2.

In this embodiment, the lower rollers 11 and the upper roller 12 may be formed into a shape of a stepped roller by varying radii thereof in an axial direction so as to form a step or a sloping surface (conical surface).

{Second Embodiment of Curving Step A}

Figure 8:
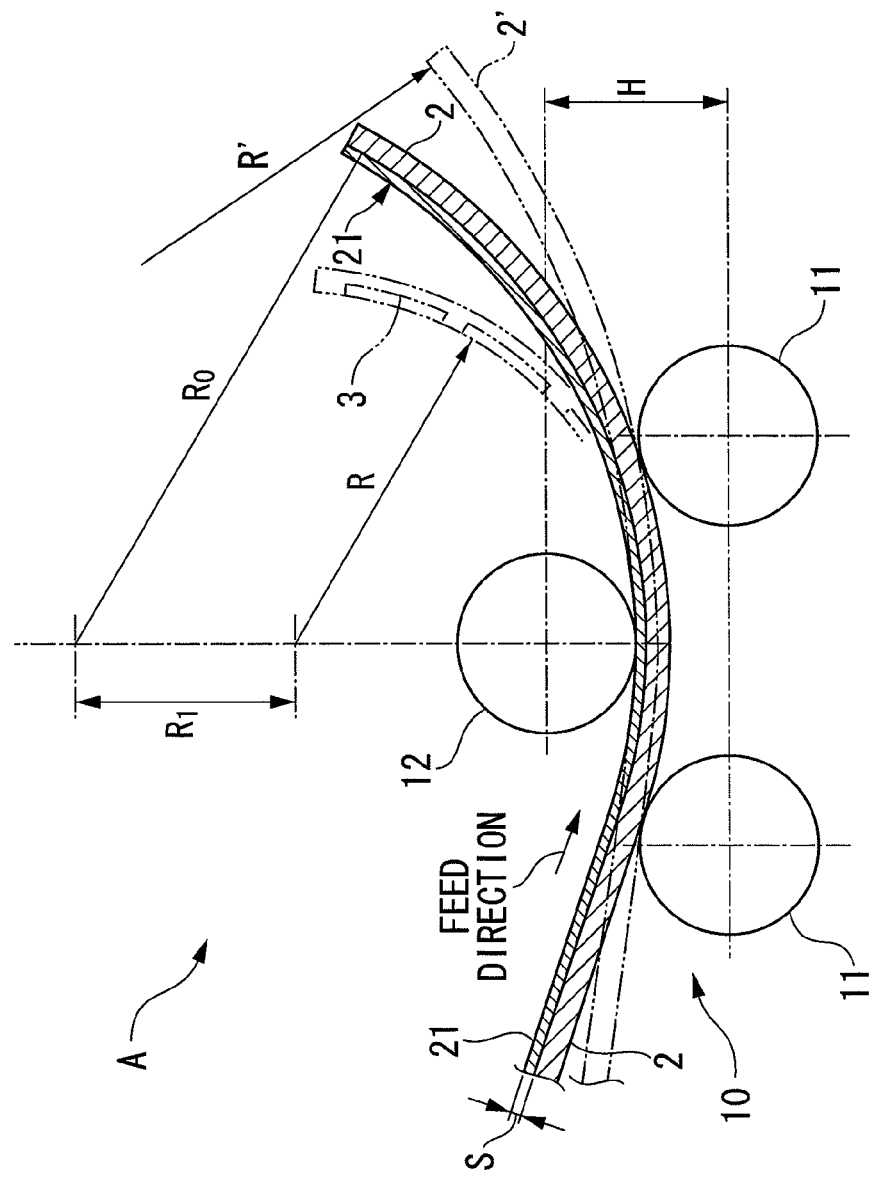
FIG. 8 is a longitudinal cross-sectional view showing a second embodiment of curving step.

FIG. 8 is a longitudinal cross-sectional view showing a second embodiment of curving step A. Also in this embodiment, an example where the roll-forming machine 10 shown in FIG. 3 is used as the curving machine will be described, but the press brake forming machine 5 shown in FIG. 2 may also be used.

Also in the second embodiment of curving step A, the net curve radius $R_0$ obtained by adding the curve radius contraction amount $R_1$ to the finished curve radius R of the plate-shaped workpiece 2 is set, taking into account an amount of contraction of the curve radius of the plate-shaped workpiece 2 due to spring-in caused by machining of the pocket 3 in the plate-shaped workpiece 2 in the next step, and the plate-shaped workpiece 2 is curved so that the curve radius of the plate-shaped workpiece 2 becomes equal to the net curve radius $R_0$.

Setting of the net curve radius $R_0$ is performed by attaching in advance a shim material 21 having a predetermined thickness to a surface (surface to be the curved inner surface) of the plate-shaped workpiece 2 where the pocket 3 is to be machined. Then, the plate-shaped workpiece in this state is curved with a constant roller interval H of the roll-forming machine 10. For the shim material 21, any material can be used as long as it has a thin-sheet shape, low elasticity, and low friction coefficient with respect to aluminum alloy which is the material of the plate-shaped workpiece 2. For example, paper (medium-quality paper, fine-quality paper, Kent paper, cardboard, etc.) is preferable. The shim material 21 is attached to the plate-shaped workpiece 2 simply by a tape, an adhesive having a low adhesion force, or the like.

Thus, as shown in FIG. 8, when the shim material 21 is attached to the side to be the curved inner surface side of the plate-shaped workpiece 2 and the plate-shaped workpiece is curved by the roll-forming machine 10 with the constant roller interval H, since the plate-shaped workpiece 2 is pressed down by the upper roller 12 by an extra amount of the thickness of the shim material 21 compared to a plate-shaped workpiece 2' to which the shim material 21 is not attached, the same result as with a reduced roller interval H is obtained, and the curve radius of the plate-shaped workpiece 2 becomes smaller. This means that, with the constant roller interval H, the thicker the shim material 21 is made, the smaller the curve radius of the plate-shaped workpiece 2 becomes. A curve radius R' in a case where the shim material 21 is not attached becomes larger than the curve radius (net curve radius $R_0$) in a case where the shim material 21 is attached.

Figure 9:
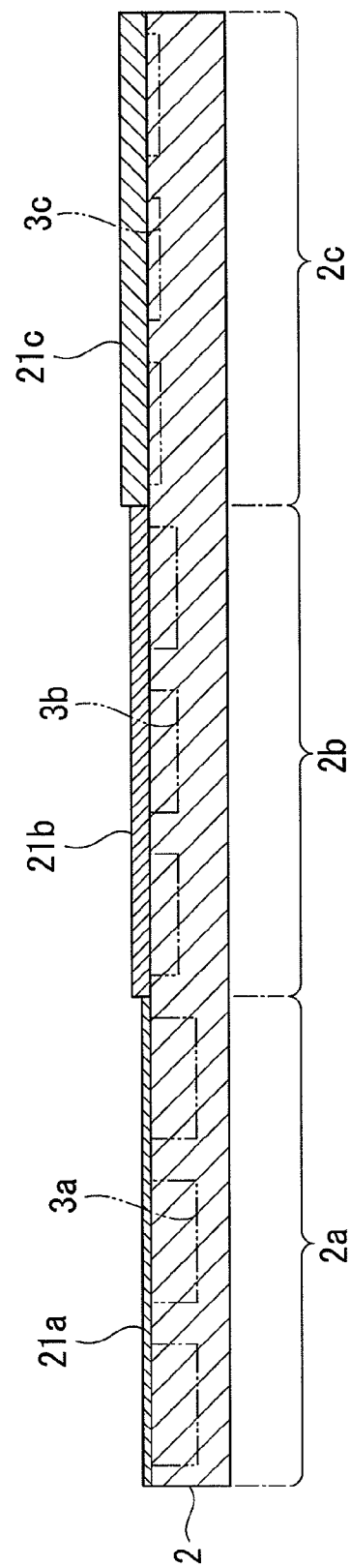
FIG. 9 is a longitudinal cross-sectional view showing a relationship between a machining amount of the pocket and a thickness of a shim.

For example, suppose that the plate-shaped workpiece 2 is divided into three regions of 2a, 2b, and 2c, and the pockets 3a, 3b, and 3c having various machining amounts are respectively formed in the regions, as shown in FIG. 9 in cross-section. In this case, a thin shim material 21a is attached to the region 2a where the pocket 3a having the largest machining amount is formed so as to set the net curve radius $R_0$ to be larger, taking into account a larger curve radius contraction amount to be caused by spring-in. Further, a thick shim material 21c is attached to the region 2c where the pocket 3c having the smallest machining amount is formed so as to set the net curve radius $R_0$ to be smaller, taking into account a smaller curve radius contraction amount to be caused by spring-in. Then, a shim material 21b having a medium thickness is attached to the region 2*b* where the pocket 3*b* having a medium machining amount is formed.

Thus, the finished curve radius R after machining of the pocket 3 can be made uniform by making the thickness of the shim material 21 thinner in a region where the machining amount of the pocket 3 is larger.

FIG. 10 is a plan view showing an example, which is similar to that shown in FIG. 9, where the plate-shaped workpiece 2 is divided into a plurality of regions and the shim material 21 having a different thickness is attached to each region. In this example, the finished curve radius R of the plate-shaped workpiece 2 is set to 3000 mm. However, as described above, since the machining amount of the pocket 3 to be formed in each region varies, the thin shim material 21 is attached to a region where the machining amount of the pocket 3 is large so as to set the net curve radius $R_0$ shown in FIG. 8 to be larger, and the thick shim material 21 is attached to a region where the machining amount of the pocket 3 is small so as to set the net curve radius $R_0$ to be smaller. The numerical value such as R5000 described in each shim material 21 is a set value of the net curve radius $R_0$. The smaller this numerical value becomes, the larger the thickness of the shim material 21 becomes. Due to the balance between adjacent regions, a shim of R3000 mm or less is attached to some regions.

In this way, even when the dimensions and shapes (shape, depth, area, interval, etc.) of the pockets 3 vary among the regions of the plate-shaped workpiece 2, by correspondingly varying the thickness of the shim materials 21 among the regions, the net curve radius $R_0$ can be separately set for each region, and the finished curve radius R after machining of the pocket 3 can be made uniform.

The scope of rights of the present invention is not limited to the configurations of the first embodiment and the second embodiment described above, but various changes can be made without departing from the scope of the claims. For example, the first embodiment and the second embodiment may be combined such that, when curving the plate-shaped workpiece 2 having the shim material 21 attached to the side to be the curved inner surface side by the roll-forming machine 10 or the press brake forming machine 5, the plate-shaped workpiece 2 is curved while the machining parts interval H of the curving machine is changed according to the regions of the plate-shaped workpiece 2.

REFERENCE SIGNS LIST

1 aircraft outer plate (formed article)
2 plate-shaped workpiece
3 pocket
5 press brake forming machine (curving machine)
7 lower die (machining part)
8 upper die (machining part)
10 roll-forming machine (curving machine)
11 lower roller (machining part)
12 upper roller (machining part)
21 shim material
A curving step
B pocket machining step
H machining parts interval of curving machine (machining parts interval for forming finished curve radius R)
$H_0$ machining parts interval for forming net curve radius $R_0$
$H_1$ setting difference
R finished curve radius
$R_0$ net curve radius
$R_1$ curve radius contraction amount

The invention claimed is:

1. A plate-shaped workpiece forming method of post-machining a pocket on a curved inner surface of a plate-shaped workpiece in a state where the plate-shaped workpiece curved by a curving machine is spread flat, the method comprising:
   a curving step of setting a net curve radius $R_0$ obtained by adding a curve radius contraction amount $R_1$ to a finished curve radius R of the plate-shaped workpiece, taking into account an amount of contraction of a curve radius of the plate-shaped workpiece between before and after machining of the pocket due to spring-in, and curving the plate-shaped workpiece so as to have the net curve radius $R_0$; and
   a pocket machining step of post-machining the pocket by flatly spreading the curved plate-shaped workpiece,
   wherein the setting of the net curve radius $R_0$ is performed by attaching in advance a shim material to a surface of the plate-shaped workpiece, the pocket machining being performed on the surface, and the plate-shaped workpiece in this state is curved with a constant interval between the machining parts of the curving machine, and
   wherein an area to which the shim material is attached is divided into a plurality of regions, and a thickness of the shim material is varied among the regions.

2. The plate-shaped workpiece forming method according to claim 1, wherein
   when an interval between machining parts of the curving machine for forming the finished curve radius R is denoted by H, and an interval between the same machining parts for forming the net curve radius $R_0$ is denoted by $H_0$, the net curve radius $R_0$ is formed under a condition of $H<H_0$.

3. A plate-shaped workpiece forming method of post-machining a pocket on a curved inner surface of a plate-shaped workpiece in a state where the plate-shaped workpiece curved by a curving machine is spread flat, comprising:
   a curving step of setting a net curve radius $R_0$ obtained by adding a curve radius contraction amount $R_1$ to a finished curve radius R of the plate-shaped workpiece, taking into account an amount of contraction of a curve radius of the plate-shaped workpiece between before and after machining of the pocket due to spring-in, and curving the plate-shaped workpiece so as to have the net curve radius $R_0$; and
   a pocket machining step of post-machining the pocket by flatly spreading the curved plate-shaped workpiece,
   wherein when an interval between machining parts of the curving machine for forming the finished curve radius R is denoted by H, and an interval between the same machining parts for forming the net curve radius $R_0$ is denoted by $H_0$, the interval between the machining parts is set at a setting interval so as to satisfy $H<H_0$, and
   wherein, during the curving step, the curve radius contraction amount $R_1$ being caused by the spring-in is calculated according to dimension and shape of the pocket to be formed, and the interval of the machining part of the curving machine is changed during the curving step from the setting interval so that the curve radius of the plate-shaped workpiece becomes equal to the net curve radius $R_0$ set separately for each region of the plate-shaped workpiece corresponding according to the dimension and shape of the pocket to be formed.

4. The plate-shaped workpiece forming method according to claim 3, wherein the net curve radius $R_0$ is made larger than the setting interval between the machining parts by increasing the interval between the machining parts in a region where the pocket having a shape which causes larger spring-in is formed, or, the net curve radius $R_0$ is made smaller than the setting interval between the machining parts by reducing the interval between the machining parts in a region where the pocket having a shape which causes smaller spring-in is formed.

* * * * *